United States Patent [19]

Fievez

[11] 4,371,327

[45] Feb. 1, 1983

[54] APPARATUS FOR USE IN PRODUCING CUP-SHAPED PASTRIES

[76] Inventor: Andre Fievez, 32, rue de Valenciennes, 59198 Haspres, France

[21] Appl. No.: 151,732

[22] Filed: May 20, 1980

[51] Int. Cl.³ .................. B29C 1/00; B29C 17/10; A21B 11/10

[52] U.S. Cl. .................... 425/218; 99/430; 249/119; 425/298; 425/344; 425/346; 425/398; 425/412

[58] Field of Search ............. 426/502, 503, 512, 94, 426/283, 275; 249/117, 119, 120, 129, 135, 125, 139, 160, 161, 171; 425/218, 235, 296, 289, 298, 302.1, 306, 316, 318, 325, 398, 299, 310, 313, 314, 324.1, 344, 346, 412; 99/432, 439, 430, 375

[56] References Cited

U.S. PATENT DOCUMENTS

| | | | |
|---|---|---|---|
| 337,946 | 3/1886 | Greene | 100/257 |
| 883,296 | 3/1908 | Cook | 99/432 |
| 1,228,288 | 5/1917 | Bower | 425/298 |
| 1,293,819 | 9/1919 | Lewison | 425/346 |
| 2,006,938 | 7/1935 | Birkenhauer | 249/117 |
| 2,493,854 | 1/1950 | Brainard | 249/119 |
| 3,162,077 | 12/1964 | Brümmer | 425/302.1 |
| 3,290,154 | 12/1966 | Turner | 425/346 |
| 4,105,736 | 8/1978 | Padovani | 425/302.1 |
| 4,239,727 | 12/1980 | Myers et al. | 425/398 |
| 4,262,588 | 4/1981 | McDonald | 100/257 |

FOREIGN PATENT DOCUMENTS

| | | | |
|---|---|---|---|
| 75285 | 10/1893 | Fed. Rep. of Germany | 425/299 |
| 356895 | 12/1905 | France | 99/439 |

Primary Examiner—Willard E. Hoag
Attorney, Agent, or Firm—Robert E. Burns; Emmanuel J. Lobato; Bruce L. Adams

[57] ABSTRACT

Apparatus for producing pastry comprises a plate having a plurality of mold cavities arranged in a regular pattern. Each of the cavities has at its upper rim an upwardly projecting cutting edge. A sheet of dough is laid over the plate and pressed toward it by a flat plate or rolling pin so that the cutting edges cut out individual dough pieces, one in each mold cavity. The dough pieces are pressed into the cavities by cup-shaped elements carried by a rigid support and arranged in the same pattern as the mold cavities so that a cup-shaped element enters each cavity. The distance the cup-shaped elements enter the mold cavities is limited by adjustable screws on the support. The cup-shaped elements are of material having good heat conductivity and thermal capacity and are left in the mold cavities during baking to assure uniform baking of the pastry.

7 Claims, 3 Drawing Figures

APPARATUS FOR USE IN PRODUCING CUP-SHAPED PASTRIES

This invention relates to a cell-like plate for use in pastry, lining means associated therewith and the method of using same in practice.

Pastry plates in which cells or mold cavities are disposed in regular rows and columns constituting a juxtaposition of separate molds of known type are already known. These known cell-like plates are advantageous in that the handling thereof is considerably simpler and easier than that of an equivalent number of separate molds; however, they are also objectionable for various reasons: thus, notably, they require the formation of separate dough pieces which must subsequently be disposed in proper registration with the mold cavities, so that the lining operation may cause the dough to conform to the shape of said mold cavities. Now these operations, accomplished manually and separately, are particularly time-robbing and tedious, and in addition the result is not always really satisfactory because the dough thickness is rather irregular.

To prevent the volume of the dough from increasing excessively and irregularly during the baking step, it is customary to place a sheet of sulphurized paper on the dough bottom, whereafter solid particles such as small aluminum grains are added thereon to constitute a load. This operation is also performed manually and separately for each mold impression. This procedure is obsolete, time-robbing, expensive and moderately satisfactory because the uniformity in the thickness of the baked dough bottom depends on the magnitude and distribution of the solid particles implemented.

It is the primary object of this invention to avoid these inconveniences by providing a cell-type pastry plate comprising on the one hand built-in means permitting of cutting a main sheet of dough placed upon the plate and registering with each mold impression, so that separate dough pieces for each mold impression, notably with the assistance of pressing means, can be obtained, and on the other hand built-in means capable of easily removing any excess dough cut between the separate dough pieces, outside the mold impressions.

Lining means capable of forming bottoms lining perfectly the inner surface of the mold impressions are adapted to cooperate with the cell-like pastry plate.

According to the method of utilizing the plate and the lining means, the procedure consists in spreading all over the plate a sheet of dough prepared beforehand, lining the cells of this plate with the sheet by using lining means during a single operation, pressing this sheet in order to cut separate dough pieces or tarts driven into each cell or mold impression, removing the excess dough cut outside the cells, then completing the lining of the individual tarts by using the same lining means and finally leaving these means in position during the tart baking operation.

This cell-like pastry plate, the lining means and the method of using them provide many advantages in comparison with the known state of the art. Thus, the main dough sheet is cut rapidly with a reduced effort and regularly so as to correspond exactly to the mold configuration, and the individual dough pieces are located exactly in front of the mold impression or cavities, without having been handled or damaged. All the mold impressions are lined very rapidly and simultaneously. The linings are regular and uniform. The lining means are left in position during the baking and the operation consisting in introducing predetermined loads into each cell is dispensed with. Finally, the use of lining means as a load during the baking step provides particularly advantageous results. The plate itself can be made from light metal or light-alloy stock having a high thermal conductibility, so that the product is baked more rapidly and regularly.

Other advantages and features of the invention will appear as the following description proceeds with reference to a specific and preferred form of embodiment thereof illustrated diagrammatically in the accompanying drawing, in which.

Figure 1:
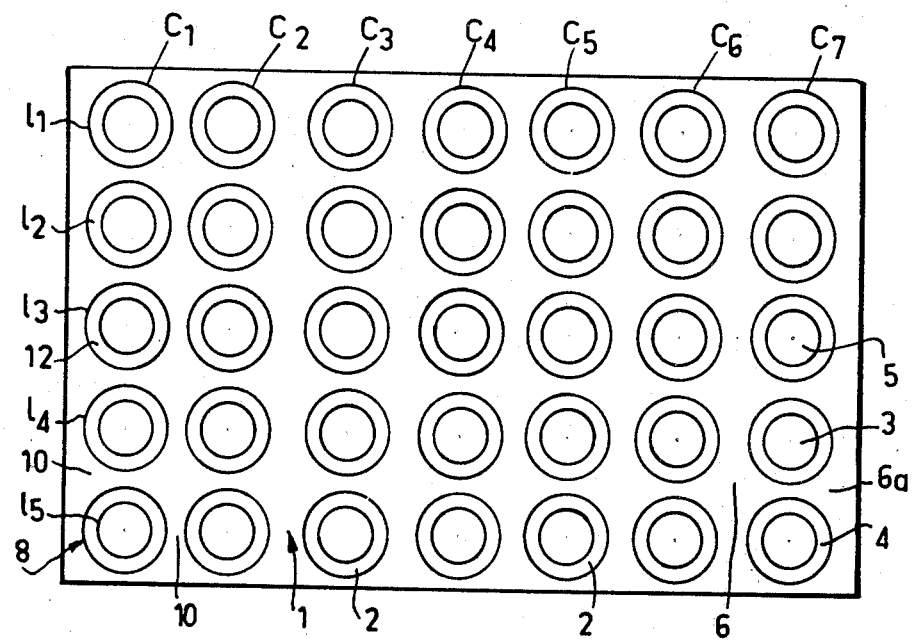
FIG. 1 is a diagrammatic top view of a pastry plate according to the present invention.

A pastry plate 1 according to this invention (FIGS. 1 and 2) comprises on the one hand a plurality of separate cell-like mold cavities or impressions 2 corresponding to the negative configuration of the external contour of the pastry tarts or like products to be obtained, each cavity comprising a flat bottom 3 and a preferably frustoconical lateral wall 4 extending from the bottom 3 up to the mold aperture 5, and on the other hand a rigid support 6 rigidly interconnecting the mold cells 2 with one another through the upper free end portion 7 of support 6, so that the bottoms 3 be coplanar and the apertures 5, likewise coplanar, lie on the same side of the plate.

In the Figures, the mold cavities 2 have circular or plain frusto-conical lateral walls 4, but it would not constitute a departure from the basic principles of the invention to provide any other shape, notably splined lateral walls.

Figure 2:
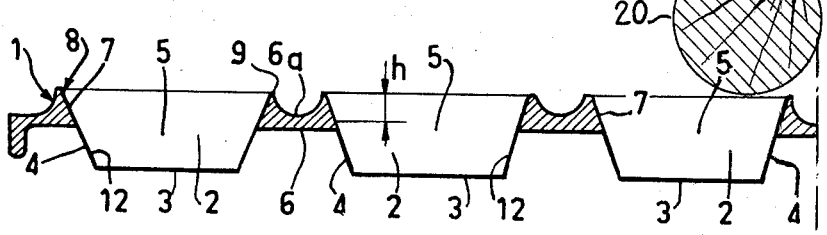
FIG. 2 is a fragmentary diagrammatic sectional view taken on a larger scale along the line 2—2 of FIG. 1.

The mold cavities 2 are disposed modularly and regularly on plate 1 and repeated notably along rows and columns, for example five rows 11 to 15 and seven columns c1 to c7 as illustrated in FIG. 1. Of course, any other arrangement of the mold cavities 2 or a different number of rows or columns may be adopted without departing from the basic principles of the invention.

The plate 1 comprises means 8, forming an integral part thereof, for facilitating the cutting of a main sheet of pastry laid upon the plate 1, across each mold cavity 2, into separate, individual pastry tarts or dough pieces disposed in the apertures 5 consisting of the upper sharp free edges 9 of the lateral walls 4 which project from the top face 6a of support 6 by a height h for example of a few millimeters, notably 4 mm, corresponding substantially to the thickness of the pastry tart contemplated.

Cooperating with the means 8 are other means adapted to press a main sheet of pastry dough against the plate 1 towards the cavities 2, said other means being for example in the form of a flat plate or a rolling-pin 20 known per se.

The plate 1 comprises means, formed integrally therewith, for removing the excess dough from between the separate tarts, said means consisting notably of the edges of the upper curved face 6a having its concavity directed in the same direction as the mold cavities 2 so as to form recesses 10 surrounding the edges 9.

The plate 1 is used as follows: firstly, a main sheet of pastry dough is prepared, this sheet having substantially the dimensions of the plate 1. This sheet is laid flat upon the plate 1 on the side of the apertures 5. The sheet is sunk at least lightly into the mold cavities 2, by using lining means to be described presently. Pressing means are then used for applying the dough against the bottoms 3. During this operation, the sharp edges 9 cut the main sheet and form individual tarts or dough pieces detached from one another and placed into each mold cavity 2 through the aperture 5 thereof. The excess dough of the main sheet, which subsists between the separate tarts, is thus concentrated in the grooves 10.

Lining means 11 are adapted to cooperate with the plate 1, the first function devolved to said lining means 11 being to line the inner walls 12 of the mold cavities 2 with the dough constituting the separate linings, in order to constitute separate tart bottoms.

The lining means 11 are each in the form of a cup 13 having a shape complementary to that of the mold cavity 2 but with smaller dimensions in order to provide between the cup 13 and the mold cavity 2 a free space 14 adapted to be filled with the bottom dough having a thickness of about 5 mm, for example 6 mm.

Figure 3:
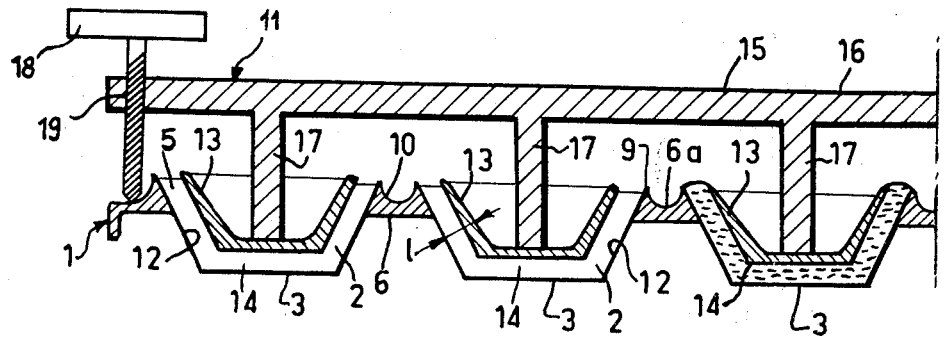
FIG. 3 is a fragmentary diagrammatic view similar to FIG. 2 showing the pastry plate associated with a lining device according to this invention.

A plurality of such cups 13 are assembled to constitute a rigid, unitary assembly in which the cups 13 are disposed uniformly, repeatedly and modularly, with the same arrangement as that of mold cavities 2 in plate 1. For instance, the assembly 15 (FIG. 3) constitutes either a bar corresponding to the whole or part of a row or column of mold cavities 2, or a full single plate corresponding to the general dimensions of plate 1.

The assembly 15 further comprises a rigid, flat, unitary support 16 and a plurality of parallel bars 17 of same length, secured at a first end to a same side of said support 16, notably at right angles thereto, and having the aforesaid cups 13 secured to their opposite ends.

The lining means are used as follows, as far as their first function is concerned: when the separate pastry pieces are introduced into mold cavities 2 through the apertures 5 thereof, the lining means 11 are disposed in front of the plate 1 so that the cups 13 registers with the apertures 5 of mold cavities 2. Then the lining means 11 are moved in relation to the plate 1 so that the cups 13 penetrate into the registering mold cavities 2 towards the bottoms 3 thereof, in order to cause the separate pastry pieces to assume the shape of the inner walls 12 of cavities 2, so that separate tarts are obtained.

According to a possible improvement, means warranting a controlled thickness of the free space 14 are provided in the form of shims having a strictly controlled thickness, which are secured to the plate 1 and/or to the lining means 11, said shims being adapted to abut against the lining means 11 and/or the plate 1 externally of the mold cavities 2. These shims may consist of bars secured to said plate support 6 and/or support 16 parallel to bars 17, which abute the support 16 and/or plate support 6. According to a modified form of embodiment, these shims may be replaced by adjustable means consisting for example of set screws 18 possibly associated with lock nuts and engaging tapped holes 19 formed through the support 16, notably at the free outer portions thereof, these screws being adapted to react against the support 6. Thus, the thickness of the free gap 14 may be adjusted notably as a function of the type of dough utilized (puff dough, shortbread, sweet dough, short pastry, raised dough) and of the desired type of baking and expansion.

The lining means 11 have a second function concerning the baking of the pastry bottoms, during which said means are left in position. With this procedure, on the one hand a satisfactory distribution of heat is obtained by conduction along the lining means 11, and on the other hand the bottoms 3 are adequately loaded to avoid any excessive swelling of the dough and preserve its regular shape.

To this end, the cups 13 are made from a material having a good heat conductibility, and preferably a sufficient heat capacity so that the dough can be baked gradually and homogeneously throughout its surface, both internally and externally; thus, the dough will swell uniformly while substantially all moisture is removed therefrom, with the advantageous effect of increasing its preservation time without any detrimental effect on the baked bottoms.

Preferably, the plate 1 and lining means 11 are made of cast aluminum, a material having a high strength and a very satisfactory heat conductibility. The inner surfaces 12 and the top face 4 of support 6, as well as the cups 13 may be coated with a material capable of preventing the dough from adhering thereto.

When it is desired to form scallops along the upper edge of the tarts, a piece of dough is cut by using a punch of corresponding shape. The separate dough pieces are placed into the apertures 5 and the method is carried out as explained hereinabove.

I claim:

1. Apparatus for producing pastry comprising a plate having a plurality of mold cavities disposed at spaced intervals in a uniform repeating and modular pattern, means for cutting a main sheet of dough laid over said plate into individual dough pieces each registering with a mold cavity, means for implementing removal from said plate of portions of said dough sheet between said cavities and means for pressing said individual dough pieces into respective cavities of said sheet, comprising a rigid support and a plurality of cup-shaped pressing elements secured on the lower side of said support, said cup-shaped pressing elements being of a shape corresponding to the shape of said mold cavities but of smaller size to be received in said mold cavities, and being disposed on said support at spaced intervals in the same uniform repeating, modular pattern as said mold cavities so that each cup-shaped element registers and cooperates with a corresponding mold cavity of said plate, said cup-shaped elements cooperating with said mold cavities to press said individual dough pieces into said mold cavities and confine them between said mold cavities and said cup-shaped elements.

2. Apparatus according to claim 1, in which said rigid support of said pressing means comprises a plate and bars projecting down from said plate, said cup-shaped elements being fixed on lower ends of said bars.

3. Apparatus according to claim 1, in which said cup-shaped elements are made of a material having good heat conductivity and thermal capacity, said cup-shaped elements being left in said mold cavities during baking of said pastry.

4. Apparatus according to claim 1, in which said cutting means comprises sharp edges projecting up around lateral walls of said cavities and means for forcing a main sheet of dough against said edges to cut said sheet between said edges and said forcing means.

5. Apparatus according to claim 4, in which said means implementing removal from said plate of portions of dough between said mold cavities comprises concavities in the upper surface of said plate between said sharp edges.

6. Apparatus according to claim 1, further comprising means limiting entry of said cup-shaped elements into said mold cavities and thereby defining the thickness of dough confined between said mold cavities and said cup-shaped elements.

7. Apparatus according to claim 6, in which said limiting means comprises means for varying the entry of said cup-shaped elements into said mold cavities.

* * * * *